United States Patent
Zahedi et al.

(10) Patent No.: US 11,632,635 B2
(45) Date of Patent: Apr. 18, 2023

(54) HEARING AID COMPRISING A NOISE REDUCTION SYSTEM

(71) Applicant: Oticon A/S, Smørum (DK)

(72) Inventors: Adel Zahedi, Smørum (DK); Michael Syskind Pedersen, Smørum (DK); Lars Bramsløw, Smørum (DK); Thomas Ulrich Christiansen, Smørum (DK); Jesper Jensen, Smørum (DK)

(73) Assignee: Oticon A/S, Smørum (DK)

( * ) Notice: Subject to any disclaimer, the term of this patent is extended or adjusted under 35 U.S.C. 154(b) by 70 days.

(21) Appl. No.: 17/233,234

(22) Filed: Apr. 16, 2021

(65) Prior Publication Data
US 2021/0329388 A1 Oct. 21, 2021

(30) Foreign Application Priority Data
Apr. 17, 2020 (EP) .................................. 20170200

(51) Int. Cl.
*H04R 25/00* (2006.01)
*G10L 15/08* (2006.01)
(Continued)

(52) U.S. Cl.
CPC ............ *H04R 25/505* (2013.01); *G10L 15/08* (2013.01); *G10L 25/18* (2013.01); *G10L 25/21* (2013.01);
(Continued)

(58) Field of Classification Search
CPC .............. H04R 2225/43; H04R 25/405; H04R 25/407; H04R 25/505; H04R 1/1083;
(Continued)

(56) References Cited

U.S. PATENT DOCUMENTS 10,165,373 B2 12/2018 Bertelsen et al.
2012/0051548 A1* 3/2012 Visser .................... H04R 3/005
381/56
(Continued)

OTHER PUBLICATIONS

Extended European search report issued in Application No. 20170200.8 dated Oct. 8, 2020.
(Continued)

*Primary Examiner* — Norman Yu
(74) *Attorney, Agent, or Firm* — Birch, Stewart, Kolasch & Birch, LLP

(57) ABSTRACT

A hearing aid comprises a) a multitude of M input transducers each providing an electric input signal representative of environment sound in a time-frequency representation (k, l), and each comprise varying amounts of target (s) and noise (v) signal components; b) a signal processor configured to process said multitude of electric input signals; and comprising a beamformer filter configured to receive said multitude M of electric input signals and to provide a spatially filtered signal and a post-filter configured to receive said spatially filtered signal and to provide an estimate $\hat{S}(k,l)$ of a target signal representing said target signal components from said target sound source. The signal processor is configured to provide estimates of power spectral densities $\lambda_s(k,l)$ of said target signal components in dependence of inter-frequency bin relationships between the spectral components enforced by properties of the electric input signals across at least some of said frequency bins.

20 Claims, 4 Drawing Sheets

(51) Int. Cl.
*G10L 25/18* (2013.01)
*G10L 25/21* (2013.01)
*G10L 25/84* (2013.01)

(52) U.S. Cl.
CPC ............ *G10L 25/84* (2013.01); *H04R 25/405* (2013.01); *H04R 25/407* (2013.01); *G10L 2015/088* (2013.01); *H04R 2225/43* (2013.01)

(58) Field of Classification Search
CPC ... H04R 1/406; G10L 15/08; G10L 2015/088; G10L 25/18; G10L 25/21; G10L 25/84; G10L 2021/02166
USPC ........... 381/317, 71.1, 71.11, 94.1, 312, 316, 381/320, 313
See application file for complete search history.

(56) References Cited

U.S. PATENT DOCUMENTS

| | | | |
|---|---|---|---|
| 2014/0056435 A1* | 2/2014 | Kjems | .................... G10L 15/20 381/317 |
| 2014/0126745 A1 | 5/2014 | Dickins et al. | |
| 2018/0012616 A1* | 1/2018 | Salishev | .................. H04R 1/04 |
| 2018/0359572 A1 | 12/2018 | Jensen et al. | |

OTHER PUBLICATIONS

Zahedi et al., "A Constrained Maximum Likelihood Estimator of Speech and Noise Spectra With Application to Multi-Microphone Noise Reduction", ICASSP 2020, 2020 IEEE, Apr. 1, 2020, pp. 6944-6948.

\* cited by examiner

HEARING AID COMPRISING A NOISE REDUCTION SYSTEM

SUMMARY

The present disclosure relates to hearing aids, e.g. hearing instruments configured to compensate for a user's hearing impairment, or similar devices. The present disclosure relates to noise reduction in hearing aids.

State-of-the-art multi-microphone speech enhancement systems typically apply a beamformer which makes use of the spatial information across the microphone signals to suppress the interfering signals arriving from undesired directions. This is typically followed by a so-called single-channel postfilter that further processes the output of the beamformer to ensure the delivery of a high-quality sound. This process requires an estimation of the speech and noise spectra. Existing methods for making such estimations handle the problem for each frequency bin independently. This simplifies the problem, but precludes the possibilities for making use of the inter-bin relationships between the spectral components enforced by the across frequency (e.g. sub-band or full-band) properties (e.g. energy) of the signals.

In the present application, it is proposed to use the information across the frequency bins through a power-constraint enforced on a maximum likelihood estimator of the speech and noise spectra. The resulting estimator may thereby improve speech quality without compromising the intelligibility of speech.

A Hearing Aid:

In an aspect of the present application, a hearing aid, e.g. a hearing instrument, configured to compensate for a user's hearing impairment is provided. The hearing aid may comprise an input unit comprising a multitude of M input transducers, each configured to convert sound in an environment of the user to an electric input signal representative of the sound, each of the multitude of electric input signals being provided in a time-frequency representation (k, l), where k and l are frequency and time frame indices, respectively, (k, l) defining a time-frequency tile, and $k=1, \ldots, K$, where K is a number of frequency bins, and wherein the electric input signals $X_m(k,l)$, $m=1, \ldots, M$, each comprise varying amounts of target (s) and noise (v) signal components originating from a target sound source and one or more noise sound sources, respectively, in the environment. The hearing aid may further comprise a signal processor configured to process the multitude of electric input signals and for providing a processed electric signal representative of the sound. The signal processor may comprise a noise reduction system comprising a beamformer filter followed by a post-filter. The beamformer filter may be connected to the input unit and configured to receive the multitude M of electric input signals $X_m(k,l)$ and configured to provide a spatially filtered signal. The post-filter may be configured to receive the spatially filtered signal and to provide an estimate $\hat{S}(k,l)$ of a target signal representing said target signal components from said target sound source. The processed electric signal provided by the signal processor may be equal to, or comprise, or be a further processed version of, the estimate $\hat{S}(k,l)$ of the target signal. The signal processor may be configured to provide estimates of power spectral densities $\lambda_s(k,l)$ and $\lambda_v(k,l)$ of the target and noise signal components, respectively. The signal processor may be configured to provide estimates of power spectral densities $\lambda_s(k,l)$ of said target signal components in dependence of inter-frequency bin relationships between the spectral components of the target signal components and/or of the noise signal components across at least some of said frequency bins. The inter-frequency bin relationships may e.g. comprise functional relationships among a multitude of time-frequency bins at a given time frame, e.g. a multitude of neighbouring time-frequency bins, e.g. time-frequency bins of a frequency sub-band signal, or of the full-band signal (e.g. over all frequency bins (k) of a given time frame (l')).

Thereby an improved noise reduction may be provided.

The estimates of power spectral densities $\lambda_s(k,l)$ of the target signal components may be provided under the constraint that the final (e.g. maximum likelihood) target speech power spectral density estimates $\lambda_s(k,l)$ a) are all non-negative, and b) sum (across frequency, for a given time-frame index) to a less biased, (e.g. unbiased) a priori estimate of the clean speech estimate for the frequency range in question, e.g. a frequency sub-band or a full-band signal.

A 'full-band signal' is taken to mean a signal comprising frequency bins representative of the full operational frequency range of the hearing aid, e.g. 0 to 10 kHz (e.g. represented by frequency indices $k=1, \ldots, K$, K being e.g. 128). A 'frequency sub-band signal' is taken to mean a signal comprising frequency bins representative a frequency range smaller than the full operational frequency range of the hearing aid, e.g. frequency bins between minimum and maximum frequency indices $k_i^{min}$ and $k_i^{max}$, respectively, for a given frequency sub-band i.

The term 'inter-frequency bin relationships' is taken to mean dependencies across a number (two or more) of frequency bins (at a given time frame l', and possibly also over a number of (e.g. past) time frames).

The term 'at least some of said frequency bins' is in the present context taken to mean two or more, e.g. a number of neighbouring (adjacent) bins.

The signal processor may comprise or have access to a multitude D of observations of the electric input signals $X_m(k,l)$ at different time frame indices l. The term 'has access to' is intended to mean that the 'accessible observations' (or parameters derived therefrom) being either stored or recursively updated (i.e. the observations are not necessarily simultaneously available). The multitude D of observations of the electric input signals $X_m(k,l)$ at different time frame indices l (e.g. $l=l'-D+1, \ldots, l'-1, l'$) may be stored in a memory accessible to the signal processor, e.g. a memory of the hearing aid. The multitude D of observations may not necessarily be stored—instead, the latest/newest observation may be used for recursively updating an estimate of a quantity of interest, e.g., an inter-microphone covariance matrix or a power-spectral density.

The signal processor may be configured to provide first maximum likelihood estimates $\lambda_s^{ML}(k,l)$ and $\lambda_v^{ML}(k,l)$ of power spectral densities $\lambda_s(k,l)$ and $\lambda_v(k,l)$ of said target and noise signal components, respectively, estimated independently in each frequency bin. The first maximum likelihood estimates $\lambda_s^{ML}(k,l)$ and $\lambda_v^{ML}(k,l)$ may e.g. be determined by solving an estimation problem in an unconstrained manner.

The signal processor may be configured to provide estimates of power spectral densities $\lambda_s(k,l)$ of said target signal components in dependence of said multitude of observations of the electric input signals by solving an estimation problem wherein the likelihood of said power spectral densities of said target and noise signal components is maximized, where the likelihood is computed across a multitude of frequency bins for a given time instant l', under constraints regarding said estimates of power spectral densities $\lambda_s(k,l)$ of said target signal components. The likelihood may e.g. be computed across frequency bins, $k=k_i^{min}, \ldots, k_i^{max}$, from a minimum ($k_i^{min}$) to a maximum ($k_i^{max}$) frequency index, for a given time instant l' under constraints regarding said estimates of power spectral densities $\lambda_s(k,l)$ of said target signal components.

The constraints may comprise
a) that a sum of said estimates of power spectral densities $\lambda_s(k,l)$ over frequency indices, $k=k_i^{min}, \ldots, k_i^{max}$, is equal to a corresponding sum of first maximum likelihood estimates $\lambda_s^{ML}(k,l)$, and
b) that each of said estimates of power spectral densities $\lambda_s(k,l)$ over frequency indices, $k=k_i^{min}, \ldots, k_i^{max}$, are larger than or equal to zero.

Frequency bins between $k_i^{min}$ and $k_i^{max}$ may represent a frequency sub-band of the electric input signals (cf. e.g. FIG. 4B). $k_i^{min}$ is generally smaller than $k_i^{max}$. $k_i^{min}$ may be equal to 1. $k_i^{max}$ may be equal to K. In case $k_i^{min}$ is equal to 1 and $k_i^{max}$ is equal to K, index i represents a full-band signal (e.g. 0-10 kHz).

The estimates of the power spectral densities $\lambda_v(k,l)$ of said noise signal components may be equal to the first maximum likelihood estimates $\lambda_v^{ML}(k,l)$.

The estimates of the power spectral densities $\lambda_s(k,l)$ of the target signal components may be expressed in dependence of said first maximum likelihood estimates $\lambda_s^{ML}(k,l)$ in a water filling form (cf. e.g. eq. (13)).

The estimates of the power spectral densities $\lambda_s(k,l)$ of the target signal components are determined in dependence of
the first maximum likelihood estimates $\lambda_s^{ML}(k,l)$
current beamformer weights w (k,l), and
$\hat{C}_x(k,l)$ an estimate of a noisy covariance matrix $C_x(k,l)$ computed as a sample covariance matrix of the M electric input signals $X_m(k,l)$, $m=1, \ldots, M$, or a as a recursively updated covariance matrix estimate.

The sample covariance matrix may e.g. be based on D−1 observations prior to a current time index l' (e.g. based on stored values of the electric input signals $X_m(k,l)$, or at least one value thereof, or a parameter derived therefrom, that is recursively updated). The signal processor may be configured to solve the estimation problem with respect to a frequency sub-band, wherein said frequency sub-band comprises one or more frequency bins. The scheme for determining power spectral densities $\lambda_s(k,l)$ of the target (and noise) signal components may (for a given frame/time instant) be applied in parallel in independent frequency sub-bands. In such case the signal processor is configured to provide estimates of power spectral densities $\lambda_s(k,l)$ and $\lambda_v(k,l)$ of the target and noise signal components, respectively. The power spectral density $\lambda_s(k,l)$ of the target signal components is provided in dependence of inter-bin relationships between the spectral components enforced by sub-band properties of the signals (target signal components as well as, or, noise signal components across frequency bins). A frequency sub-band may consist of one or more spectral components (e.g. STFT coefficients, frequency bins, cf. e.g. FIG. 4B). The hearing aid may comprise frequency bin to frequency sub-band conversion units (and corresponding frequency sub-band to frequency bin conversion units) as appropriate. A frequency bin to frequency sub-band conversion unit is adapted to provide (e.g. non-uniform) frequency sub-bands 1, ..., I from (uniform) frequency bins 1, ..., K, where K>I, cf. left part of FIG. 4B.

The signal processor may be configured to solve the estimation problem with respect to a multitude of frequency sub-bands independently for each frequency sub-band.

The post-filter may be configured to apply post-filter gains to the spatially filtered signal in dependence of the estimates of power spectral densities $\lambda_s(k,l)$ and $\lambda_v(k,l)$ of the target and noise signal components to thereby provide said estimate $\hat{S}(k,l)$ of the target signal. The post-filter gains $G_{PF}(k,l)$ may e.g. be determined from the respective target and noise power spectral densities $\lambda_s(k,l)$ and $\lambda_v(k,l)$, for example as a single-channel Wiener filter gain, given by $G_{PF}(k,l)=\lambda_s/(\lambda_s+\lambda'_v)$, where $\lambda'_v$ is a normalized noise power spectral density ($\lambda'_v=\lambda_v/(d^H T^{-1}d)$). Other ways of determining an appropriate gain from the target and noise power spectral densities are available.

The beamformer filter may be constituted by or comprise an LCMV beamformer, e.g. an MVDR beamformer. In most practical systems, the actual beamformer is some kind of derivative of an optimal beamformer (such as MVDR), but the beamformer filter may comprise other kinds of beamformers, which are not necessarily of the LCMV/MVDR-type.

The hearing aid may comprise a filter bank allowing said electric input signals to be provided in a time-frequency representation (k,l), k=1, ..., K. The frequency bins may be assumed to be of uniform width, e.g. 1/K of the frequency range of operation of the hearing aid, e.g. 1/K of 10 kHz. K may represent an order of a Fourier transform algorithm, e.g. a Short Time Fourier transform (STFT) algorithm. K may e.g. be ≥16, or ≥24, or ≥64, or ≥128, etc.

The hearing aid may comprise an output unit comprising an output transducer for converting said processed electric signal to stimuli perceivable by the user as sound, and/or a transmitter for transmitting processed electric signal to another device or system. The estimate $\hat{S}(k,l)$ of a target signal representing sound from said target sound source may be presented to a user of the hearing aid. The estimate $\hat{S}(k,l)$ of a target signal representing sound from said target sound source may alternatively or additionally be transmitted to another device or system for use and/or further analysis there. The target sound source may be sound from the user's mouth (own voice). Another device may be a phone or PC, e.g. for transmitting the estimate $\hat{S}(k,l)$ of a target signal representing the user's own voice to a far end communication partner. The estimate $\hat{S}(k,l)$ of a target signal representing sound from said target sound source may be forwarded to a keyword detector of the hearing aid and/or of another device, e.g. for use in a voice control interface, e.g. of the hearing aid.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid comprises comprise an input unit for providing an electric input signal representing sound. The input unit comprises an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid comprises a noise reduction system, e.g. a multi-channel Wiener filter (MWF) or equivalent. The noise reduction system comprises a directional system (beamformer) adapted to spatially filter sounds from the environment, and thereby e.g. enhance a target acoustic source among a multitude of acoustic sources in the local environment of the user wearing the hearing aid. This can be achieved in various different ways as e.g. described in the prior art. In hearing aids, a microphone array beamformer is often used for spatially attenuating background noise sources. Many beamformer variants can be found in literature, e.g. a Linearly-Constrained Minimum-Variance (LCMV) beamformer. A special variant thereof, the minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form. The noise reduction system comprises a (single-channel) postfilter for further removing noise components from the spatially filtered (beamformed) signal comprising the target signal. The MWF can be implemented as a cascade of an MVDR beamformer and a single-channel postfilter.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation.

The communication between the hearing aid and the other device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may have a maximum outer dimension of the order of 0.05 m (e.g. a hearing instrument).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, e.g. less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$s, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI may be e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. The classification unit may be based on or comprise a neural network, e.g. a rained neural network.

The hearing aid may further comprise other relevant functionality for the application in question, e.g. compression, feedback control, etc.

The hearing aid may comprise a hearing instrument, e.g. a hearing instrument adapted for being located at the ear or fully or partially in the ear canal of a user. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising audio processing, e.g. distribution. Use may be provided in a system comprising one or more hearing aids (e.g. hearing instruments), e.g. in handsfree telephone systems, teleconferencing systems (e.g. including a speakerphone), public address systems, karaoke systems, classroom amplification systems, etc.

A Method:

In an aspect, a method of operating a hearing aid configured to compensate for a user's hearing impairment is provided. The method may comprise providing a multitude M of electric input signals representing sound in an environment of the user in a time-frequency representation (k, l), where k and l are frequency and time frame indices, respectively, (k, l) defining a time-frequency tile, and k=1, . . . , K, where K is the number of frequency bins, and wherein the electric input signals Xm(k,l), m=1, . . . , M, each comprise varying amounts of target (s) and noise (v) signal components originating from a target sound source and one or more noise sound sources in said environment;

processing said multitude of electric input signals and providing a processed electric signal representative of said sound; and providing a spatially filtered signal by beamforming in dependence the input unit and configured to receive said multitude M of electric input signals Xm(k,l), and providing an estimate Ŝ(k,l) of a target signal representing said target signal components from said target sound source by post-filtering said spatially filtered signal.

The method may further comprise providing estimates of power spectral densities $\lambda_s(k,l)$ of the target signal components in dependence of inter-frequency bin relationships between the spectral components of the target signal and/or of the noise signal components across at least some of said frequency bins.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise determining post-filter gains in dependence of said estimates of power spectral densities $\lambda_s(k,l)$ and $\lambda_v(k,l)$ of said target and noise signal components; and applying said post-filter gains to said spatially filtered signal to thereby provide said estimate Ŝ(k,l) of the target signal.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system is adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control is implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP is configured to run on cellular phone, e.g. a smartphone, or on another portable device allowing communication with said hearing aid or said hearing system.

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid/or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A h hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

Figure 2A:
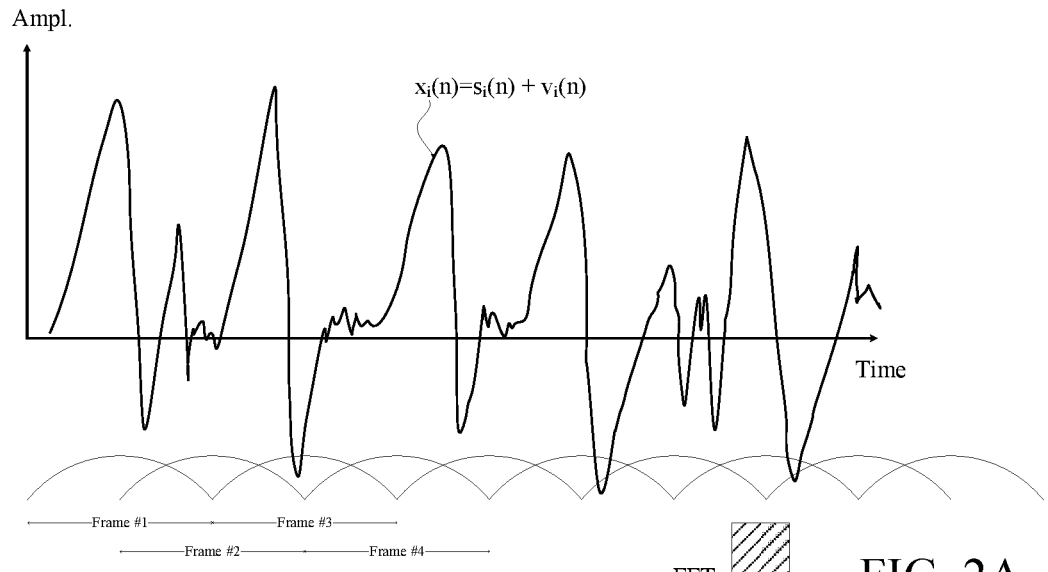
Figure 2B:
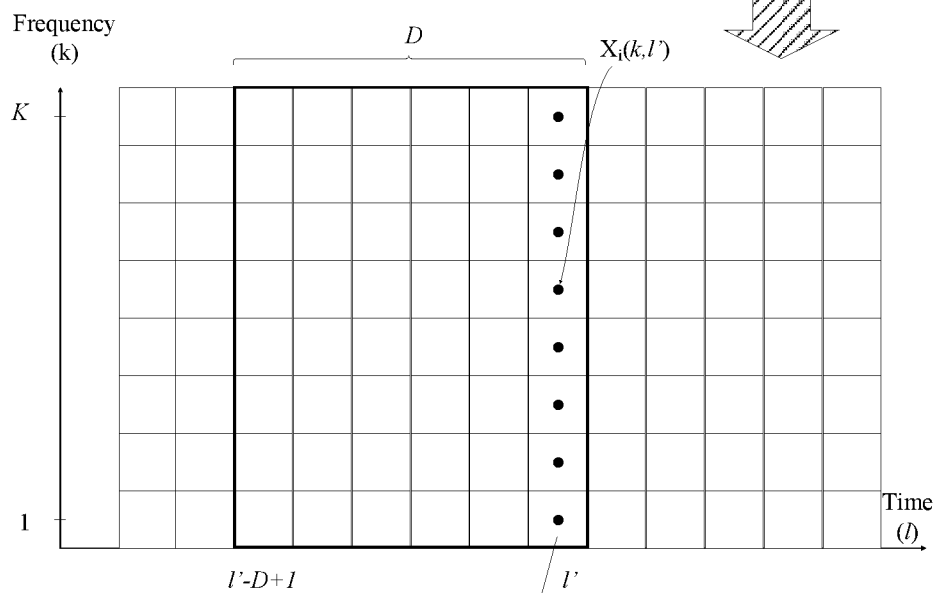
Figure 2C:
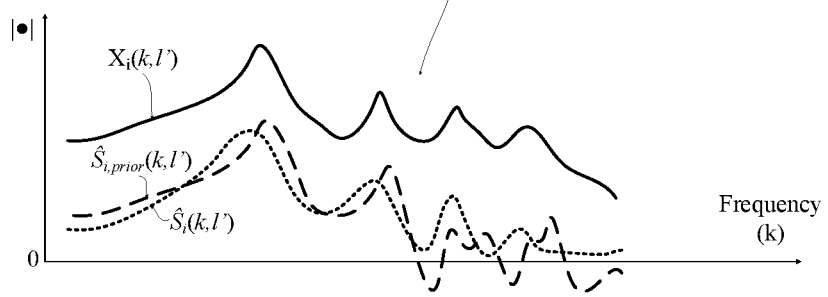
Figure 3:
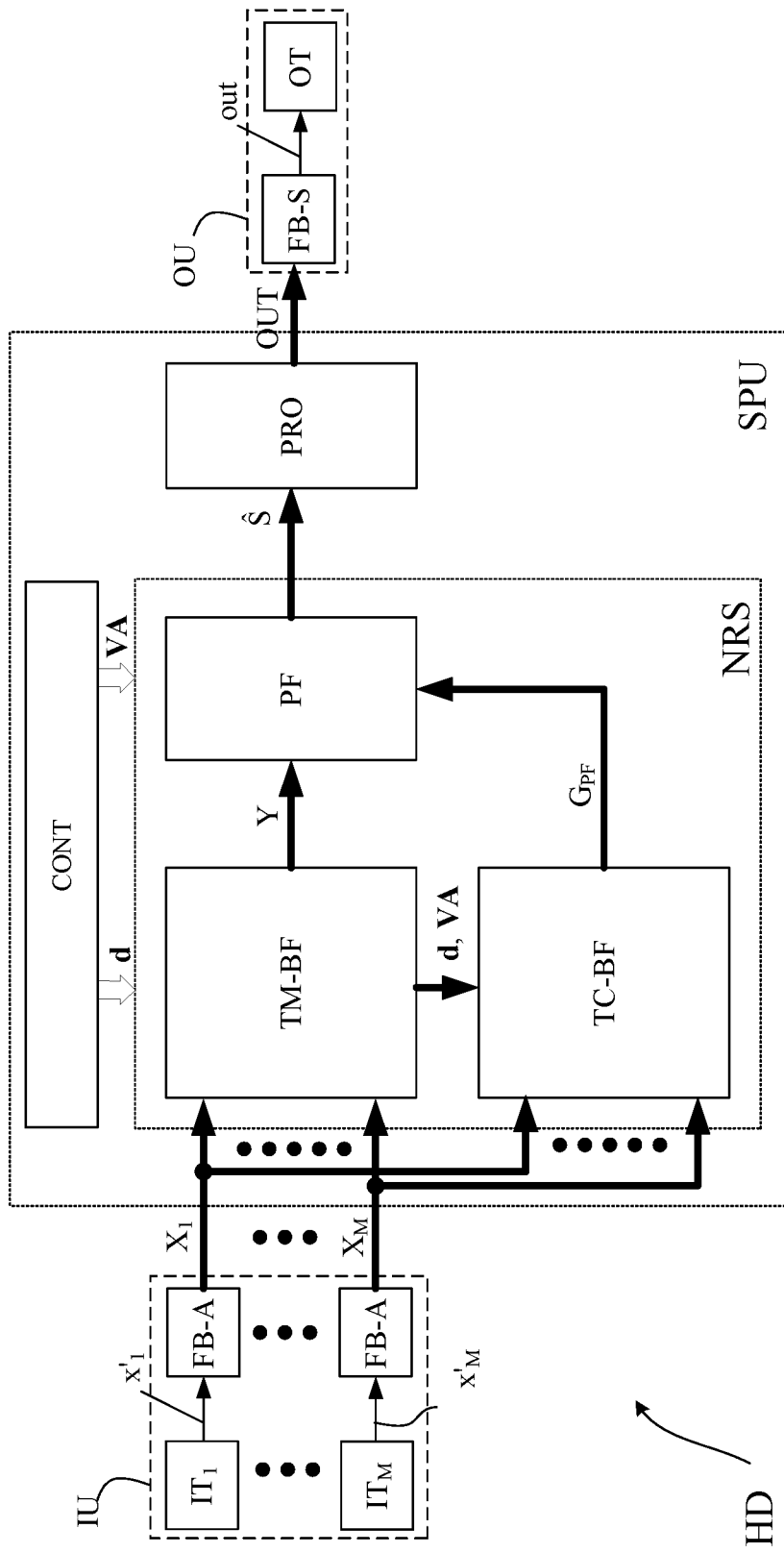
Figure 4A:
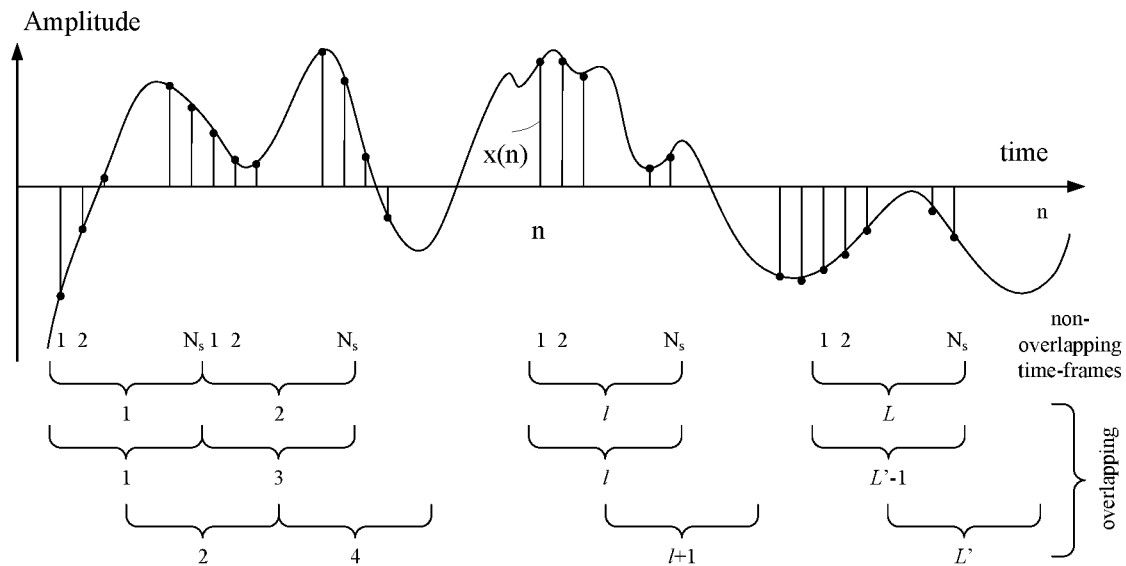
Figure 4B:
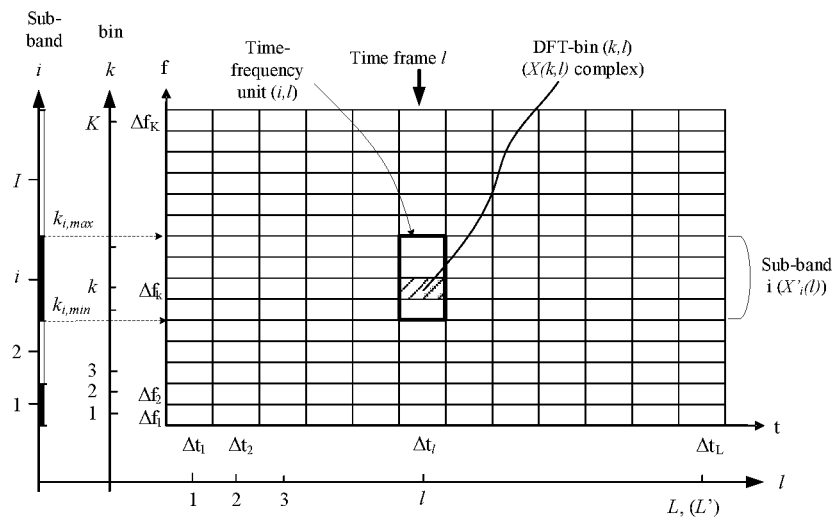

in dependence of the 'water level' $\mu$ in the range [0, 10],

FIG. 2A schematically shows (in the top part) a noisy speech signal $x_i(n)$, amplitude versus time (n), as received at an $i^{th}$ microphone of a hearing aid, and (in the bottom part) overlapping time ranges (Frame #l) for a fast Fourier transform (FFT) algorithm;

FIG. 2B schematically shows a time-frequency (frequency domain) representation $X_i(k,l)$ of the time domain signal $x_i(n)$ of FIG. 2A after an FFT, each frequency bin (time-frequency unit, $X_i(k,l)$) comprising a complex number representing a magnitude ($|X_i(k,l)|$) and a phase ($\angle X_i(k,l)$) of the signal at frequency index k and time index l, the values $X_i(k,l')$, k=1, ..., K, at time l' (K being the order of the FFT) representing a spectrum of the noisy $x_i$ signal at microphone i at time l'; and FIG. 2C schematically shows a spectrum of the noisy input signal at microphone i ($X_i(k,l')$), and estimates of the corresponding spectra of the clean speech signal $S_i(k,l')$ according to a prior art method ($\hat{S}_{i,prior}(k,l')$) and according to the present disclosure ($\hat{S}_i(k,l')$), FIG. 3 schematically shows an embodiment of a hearing aid comprising a noise reduction system according to the present disclosure, FIG. 4A schematically shows a time variant analogue signal (Amplitude vs time) and its digitization in samples, the samples being arranged in a number of time frames, each comprising a number $N_s$ of samples, and FIG. 4B schematically illustrates a time-frequency representation of the time variant electric signal of FIG. 4A, in relation to the present disclosure, The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, e.g. hearing instruments configured to compensate for a user's hearing impairment, or similar devices. The present disclosure relates to noise reduction in hearing aids.

One of the challenges with the implementation of multi-microphone noise reduction systems in practical applications lies in the need for the knowledge of the speech and noise covariance matrices. A method based on Maximum Likelihood (ML) estimation has been proposed to address the problem. Despite its relative success in practical setups, this method may suggest (physically impossible) negative spectral components for the clean speech due to noise influences.

The present disclosure proposes a new estimation technique that tackles this issue by enforcing a power constraint on the estimation problem.

Poor performance in noise is one of the most common points of dissatisfaction for the users of hearing-assistive devices (HADs). A noise reduction system is for this reason an integral part of most modern HADs. One of the most well-known noise reduction techniques is the multi-channel Wiener filter (MWF). Despite offering simple closed-form solutions, implementation of MWFs in practical setups such as in HADs tangles with practicalities, among which estimation of the generally time-varying inter-microphone statistics of speech and noise is particularly challenging.

The MWF can be decomposed as a cascade of an MVDR beamformer and a single-channel postfilter. Several methods have been proposed for estimating the signal statistics necessary to implement the MWF beamformer in general and the speech and noise power spectral densities (PSD) for implementing the postfilter in particular. A Maximum Likelihood (ML) scheme has been proposed for estimating the speech and noise PSDs. This method has been successfully used for scientific as well as industrial applications (cf. e.g. US20180359572A1, or U.S. Pat. No. 10,165,373B2). However, typically there are some frequency bins where the ML estimation scheme suggests negative values for the speech spectrum. Rounding these components up to zero, which is often done in practical speech enhancement systems, leads to an overall tendency to overestimate the speech power (cf. below for more details). In this disclosure, an estimation technique that alleviates this issue is proposed. Although the proposed method can be applied for speech and noise PSD estimation in a broader context, we focus in the present disclosure on noise reduction using the MWF.

Maximum Likelihood Estimation of Speech and Noise Spectra:

In the short-time Fourier transform (STFT) domain, we use the following model for the noisy speech X acquired by M microphones:

$$X(k,l)=S(k,l)d(k,l)+V(k,l), \quad (1)$$

where the M-dimensional vectors X(k,l) and V(k,l), respectively, represent noisy speech and noise signals at the M microphones at frequency bin k and time frame l. The clean speech signal at the reference microphone is denoted by S(k,l), and the M-dimensional vector d(k,l) is the relative transfer function for the M microphones; i.e. the transfer function from the target speech source to the M microphones normalized by the one for the reference microphone (cf. e.g. US20180359572A1). Assuming that the noise and speech signals are uncorrelated and using (1), the covariance matrix of the noisy speech is given by:

$$C_x(k,l)=\lambda_s(k,l)d(k,l)d^H(k,l)+\lambda_v(k,l)\Gamma(k,l), \quad (2)$$

Where $\lambda_s(k,l)=|S(k,l)|^2$ and $\lambda_v(k,l)$ are, respectively, the clean speech and noise spectra at the reference microphone, and $\Gamma(k,l)$ is the noise covariance matrix normalized by the noise variance at the reference microphone. One can say that $\Gamma(k,l)$ represents the structure of the noise covariance matrix. Using a voice activity detector, the noise covariance matrix can be estimated directly during the speech absence intervals. Assuming that the structure of the covariance matrix remains unchanged during speech activity intervals, (2) can be written as:

$$C_x(k,l)=\lambda_s(k,l)d(k,l)d^H(k,l)+\lambda_v(k,l)\Gamma(k,l_0), \quad (3)$$

where $l_0$ indexes the most recent frame with no speech activity. Given that the relative transfer functions d(k,l) are known, the only unknown parameters left in (3) are $\lambda_s(k,l)$ and $\lambda_v(k,l)$. Assume that X(k,l) follows a zero-mean complex circularly symmetric Gaussian distribution with the covariance matrix given in (3); i.e.

$$f_X(X(k,l); \lambda_s(k,l), \lambda_v(k,l)) = \mathcal{CN}(0, C_x(k,l)), \quad (4)$$

Also suppose that D independent observations of the noisy speech are available; e.g. D consecutive frames $\underline{X}_D(k,l) = [X(k,l-D+1) \ldots X(k,l)]$ assuming independence across the frames. The joint probability density function (pdf) of $\underline{X}_D(k,l)$ is simply given by the product of the density functions of the individual frames, and the ML estimation of $\lambda_s(k,l)$ and $\lambda_v(k,l)$ can be obtained by maximizing the resultant joint pdf; i.e.

$$\max_{\lambda_s(k,l), \lambda_v(k,l)} \ln f_{\underline{X}_D}(\underline{X}_D(k,l); \lambda_s(k,l), \lambda_v(k,l)) \quad (5)$$

which can be solved in closed-form, yielding the following (cf. e.g. [Jensen & Pedersen; 2015]):

$$\lambda_v^{ML}(k,l) = \frac{1}{M-1} \quad (6)$$

$$tr\left(\frac{1}{D}\underline{X}_D^H(k,l)B(k,l)(B^H(k,l)\Gamma(k,l_0)B(k,l))^{-1}B^H(k,l)\underline{X}_D(k,l)\right)$$

$$\lambda_s^{ML}(k,l) = w^H(k,l)\left(\hat{C}_x(k,l) - \lambda_v^{ML}(k,l)\Gamma(k,l_0)\right)w(k,l), \quad (7)$$

where 'tr' is the trace operator, and where the M×M-1 blocking matrix B(k,l) can be calculated as the first M-1 columns of $I_M - d(k,l)d^H(k,l)/d^H(k,l)d(k,l)$, $I_M$ being the M×M identity matrix, and $\hat{C}_x(k,l)$ (the sample covariance matrix) and w(k,l) (the MVDR beamformer weight vector) are defined as:

$$\hat{C}_x(k,l) \triangleq \frac{1}{D}\sum_{j=l-D+1}^{l} X(k,j)X^H(k,j) \quad (8)$$

$$w(k,l) \triangleq \frac{\Gamma^{-1}(k,l_0)d(k,l)}{d^H(k,l)\Gamma^{-1}(k,l_0)d(k,l)} \quad (9)$$

respectively.

The estimator given by eq. (6) and (7) is the minimum-variance unbiased estimator, thus achieving the Cramér-Rao lower bound (cf. e.g. [Jensen & Pedersen; 2015b]).

However, when the noise level is large compared to the speech level at a certain frequency bin k, $\lambda_s^{ML}(k,l)$ in eq. (7) may become negative. This can happen even at high global SNRs at frequency bins where the speech power is low. The typical treatment in such cases is to round up the negative values to zero (equivalent to adding a nonnegativity constraint to eq. (5)). However, one can argue that as the negative values of $\lambda_s^{ML}(k,l)$ are due to the noise influence, there is no reason to believe that the positive ones are not, especially taking into account that the estimator is unbiased. Getting rid of the negative values by trimming them to zero at some frequency bins, leaves us with spurious positive estimates at some other frequency bins, which give rise to a net effect of overestimating the speech power. Consequently, when used in an MWF context, the noise in the resulting enhanced speech signal would be under-suppressed.

The Problem to be Solved:

Suppose that $\mathcal{K} = \{1, \ldots, K\}$ is the set of all frequency bins. The optimization problem of eq. (5) is defined over individual frequency bins, and one needs to solve it separately for each and every $\lambda$. Equivalently, one can write the joint pdf for all frequency bins as the product of the individual pdfs in eq. (4), and obtain the same solution as in eq. (6)-(7) by solving the following problem:

$$\max_{\lambda_s(1,l),\ldots,\lambda_s(K,l),\lambda_v(1,l),\ldots,\lambda_v(K,l)} \ln \prod_{k=1}^{K} f_{\underline{X}_D}(\underline{X}_D(k,l); \lambda_s(k,l), \lambda_v(k,l)) \quad (10)$$

As argued above, when the noise influence is significant, $\lambda_s^{ML}(k,l)$ resulting from eq. (10) may take negative or positive spurious values depending on the frequency bin. Let us denote the ML estimate of the speech power in frame l by $P_s^{ML}(l)$, i.e.

$$P_s^{ML}(l) \triangleq \sum_{k=1}^{K} \lambda_s^{ML}(k,l) \quad (11)$$

Note that $P_s^{ML}(l)$ averages the noise influence over the individual spectral components, and is therefore likely to be less noisy than the individual estimates $\lambda_s^{ML}(k,l)$. Based on this rationale, we introduce a power constraint to (10) to formulate a new estimation problem as follows:

$$\max_{\lambda_s(1,l),\ldots,\lambda_s(K,l),\lambda_v(1,l),\ldots,\lambda_v(K,l)} \ln \prod_{k=1}^{K} f_{\underline{X}_D}(\underline{X}_D(k,l); \lambda_s(k,l), \lambda_v(k,l))$$

subject to the constraints $$\sum_{k=1}^{K} \lambda_s(k,l) = P_s^{ML}(l) \text{ and} \quad (12)$$

$$\lambda_s(k,l) \geq 0 \text{ for all } k \in \mathcal{K}$$

Solution of the Problem:

It can be shown that the solution to the problem of eq. (12) for $\lambda_v(k,l)$ is the same as $\lambda_v^{ML}(k,l)$ as expected (since the constraint in eq. (12) does not depend on $\lambda_v(k,l)$, and for $\lambda_s(k,l)$ it is given in the following 'water-filling form':

$$\lambda_s^*(k,l) = \left(\lambda_s^{ML}(k,l) - \varsigma(k,l) + \frac{\sqrt{2\varsigma(k,l)\mu(l)+1}-1}{\mu(l)}\right)^+ \quad (13)$$

where $(\bullet)^+ \triangleq \max(\bullet, \varsigma(k,l) \triangleq w^H(k,l)\hat{C}_x(k,l)w(k,l)$, and the water level $\mu(l) \geq 0$ is adjusted so that the following is fulfilled:

$$\sum_{k=1}^{K} \lambda_s^*(k,l) = P_s^{ML}(l) \quad (14)$$

Figure 1:
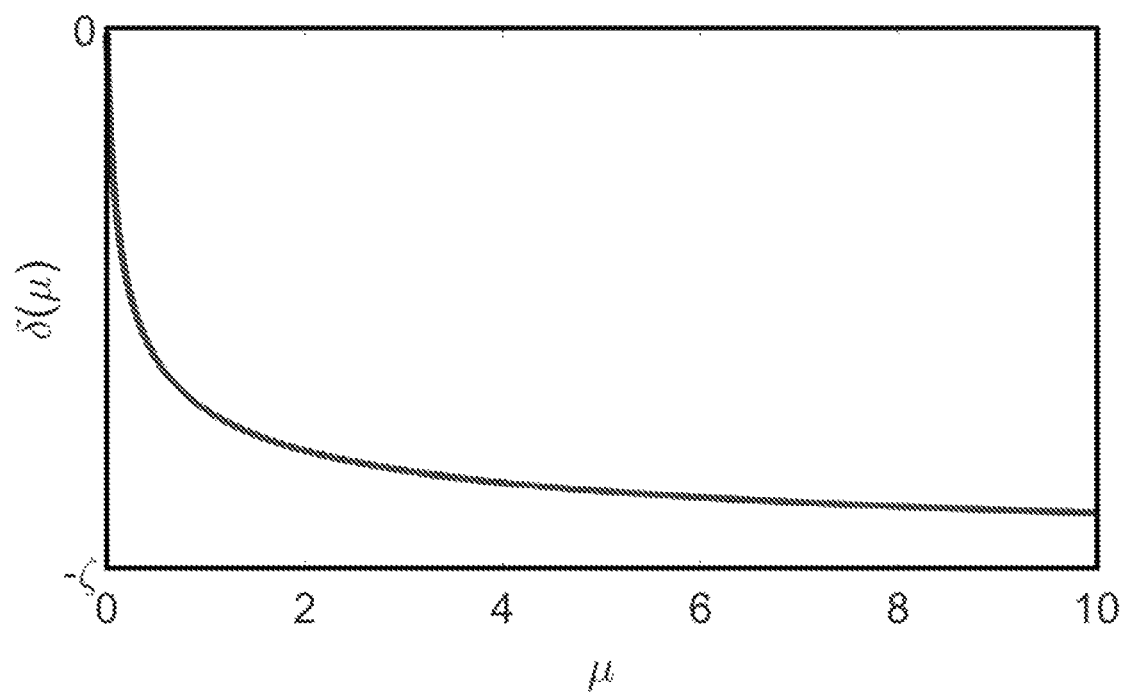
FIG. 1 shows an exemplary course of the expression $$\delta(\mu) \triangleq -\varsigma + \frac{\sqrt{2\varsigma\mu+1} - 1}{\mu}$$

The water level μ(l)≥0 can be calculated using any available efficient algorithm (cf. e.g. [Palomar & Fonollosa; 2005]) or simply using bisection. The graph of the term $$\delta(\mu) \triangleq -\varsigma + \frac{\sqrt{2\varsigma\mu + 1} - 1}{\mu}$$

is shown in FIG. 1 FIG. 1 shows an exemplary course of the expression $$\delta(\mu) \triangleq -\varsigma + \frac{\sqrt{2\varsigma\mu + 1} - 1}{\mu}$$

in dependence of the 'water level' μ in the range [0, 10]. When $\lambda_s^{ML}(k,l) \geq 0$ for all $k \in \mathcal{K}$, the water level is μ(l)=0, yielding $\lambda_s^*(k,l) = \lambda_s^{ML}(k,l)$. When $\lambda_s^{ML}(k,l) < 0$ for at least one k, δ(μ) is always negative, implying that $\lambda_s^*(k,l) < \lambda_s^{ML}(k,l)$. This, however, is only the case in frequency bins where $\lambda_s^{ML}(k,l) > 0$. In other bins, the $(\cdot)^+$ operator in eq. (13) sets $\lambda_s^*(k,l)$ equal to 0. In summary, to calculate $\lambda_s^*(k,l)$ from $\lambda_s^{ML}(k,l)$, all negative components are trimmed to 0, and each positive one is reduced by an amount that depends on its corresponding ζ(k,l).

Sub-Band Implementation:

The MWF is optimal in sense of mean-squared error (MSE). The proposed method may lead to an implementation that is closer to the ideal MWF, yielding a lower MSE. This, however, may not necessarily translate into perceptual improvements. To optimize the performance in a more perceptual-oriented manner, it is proposed implement (12) in frequency sub-bands. Suppose that $k_i^{min}$ and $k_i^{max}$ index the lowest and highest frequencies in sub-band i, respectively. The ML estimation of the speech power in sub-band i is given by:

$$P_s^{ML}(l) \triangleq \sum_{k=k_i^{min}}^{k=k_i^{max}} \lambda_s^{ML}(k, l) \quad (15)$$

Obviously, $\lambda_s^*(k,l)$ will still be given by eq. (13), but the sub-band dependent water level $\mu_i(l)$ should be adjusted such that the following holds:

$$\sum_{k=k_i^{min}}^{k=k_i^{max}} \lambda_s^*(k, l) = P_{s,i}^{ML}(l) \quad (16)$$

Further details of the proposed scheme are discussed in [Zahedi et al.; 2020].

The top part of FIG. 2A shows a noisy (time-domain) speech signal $x_i(n)$, amplitude ('Ampl.') versus time ('Time') (represented by time sample index n), as received at an $i^{th}$ microphone of a hearing aid. The noisy speech signal $x_i(n)$ is a mixture (sum) of a target signal $s_i(n)$ and a noise signal $v_i(n)$ ($x_i(n)=s_i(n)+v_i(n)$). The target signal $s_i(n)$ may originate from a (localized) target sound source and the noise signal $v_i(n)$ may originate from one or more (localized or diffuse) sound sources. The bottom part of FIG. 2A schematically illustrates overlapping time ranges ('Frame #l') for from which time samples (e.g. 64 or 128 audio data samples per frame) of the noisy input signal $x_i(n)$ are taken as input to a Fourier transform algorithm, e.g. a fast Fourier transform (FFT) algorithm, such as a STFT algorithm (cf. arrow 'FFT' in FIG. 2A). In FIG. 2A, an overlap of approximately 50% is shown. The overlap may be smaller (e.g. 25%) or larger (e. g. 75%). FIG. 2B schematically shows a time-frequency (frequency domain) representation $X_i(k,l)$ of the time domain signal $x_i(n)$ of FIG. 2A after an FFT, each frequency tile (time-frequency unit, $X_i(k,l)$) comprising a complex number (indicated by ●) representing a magnitude ($|X_i(k,l)|$) and a phase ($\angle X_i(k,l)$) of the signal at frequency index k and time frame index l, the values $X_i(k,l')$, k=1, . . . , K, at time l' (K being the order of the FFT) representing a spectrum of the noisy $x_i$ signal at microphone i at time frame l'. In FIG. 2B, the number frequency bins of a given time frame is indicated by K. K may take on any number larger than 1, 8 as shown in FIG. 2B, or 16, or 24 or 64 or more. A number (D−1) of previous time frames of the signal, $X_i(k,l')$, are, together with the current timeframe l' enclosed by a bold rectangle in FIG. 2B. The D time frames may represent the 'context' of estimation algorithms of the present disclosure, cf. e.g. eq. (5).

FIG. 2C schematically shows a spectrum (magnitude ('|●|') versus frequency ('Frequency (k)')) of the noisy input signal ($X_i(k,l')$) at microphone i, at time index l' (solid line in FIG. 2C). Likewise, estimates of the corresponding spectra of the clean speech signal $S_i(k,l')$ according to a prior art method ($\hat{S}_{i,prior}(k,l')$) (dashed line in FIG. 2C, based on eq. (5), (7)) and according to the present disclosure ($\hat{S}_i(k,l')$) (dotted line in FIG. 2C, based on eq. (12)), are shown. As schematically illustrated in FIG. 2C, the estimated spectrum, $\hat{S}_{i,prior}(k,l')$ according to a prior art method exhibits negative values of magnitude at some (here higher) frequencies, whereas the estimated spectrum, $\hat{S}_i(k,l')$ according to the method of the present disclosure does not.

FIG. 3 shows an embodiment of a hearing aid (HD) comprising a noise reduction system (NRS) according to the present disclosure. The hearing aid, e.g. a hearing instrument, comprises an input unit (IU) comprising a multitude of M input transducers ($IT_1$, . . . , $IT_M$), each configured to convert sound in an environment of the user to an electric input signal ($x'_1$, . . . , $x'_M$) representative of said sound. The input unit comprises respective analysis filter banks (FB-A) for providing each of the multitude of electric input signals in a time-frequency representation ($X_1(k,l)$, . . . , $X_M(k,l)$, k=1, . . . , K, where K is the number of frequency bins of a Fourier transformation algorithm). The electric input signals $X_m(k,l)$, m=1, . . . , M, each comprise varying amounts of target (s) and noise (v) signal components originating from a target sound source and one or more noise sound sources in said environment. The hearing aid (HD) comprises a signal processing unit (SPU) configured to process said multitude of electric input signals ($X_1(k,l)$, . . . , $X_M(k,l)$) and to provide a processed electric signal (OUT) representative of said sound. The signal processor (SPU) comprises a noise reduction system (NRS) comprising a beamformer filter (TM-BF, TC-BF) followed by a post-filter (PF). The beamformer filter (TM-BF, TC-BF) is connected to the input unit (IU) and configured to receive the multitude M of electric input signals $X_m(k,l)$, m=1, . . . , M, and configured to provide a spatially filtered signal (Y). The post-filter (PF) is configured to receive the spatially filtered signal (Y) and to provide an estimate $\hat{S}(k,l)$ of a target signal representing sound from the target sound source. The hearing aid further comprises a signal processor (PRO) for applying one or more processing algorithms to the estimate $\hat{S}(k,l)$ of the target signal, e.g. including a compressive amplification algorithm for applying a level and frequency dependent gain to compensate for the user's hearing impairment (and/or to otherwise enhance the estimate Ŝ(k,l)). The signal processor (PRO) provides processed electric signal (OUT). The hearing device further comprises an output unit (OU) comprising a synthesis filter bank (FB-S) for converting the processed electric signal (OUT) from a time-frequency representation to a time domain signal (out) and an output transducer (OT) for converting said processed electric (time domain) signal (out) to stimuli perceivable by the user as sound. The output transducer may comprise a loudspeaker for providing an air-borne acoustic signal or a vibrator for providing a structure-borne or liquid-borne acoustic signal. In some hearing aids, the output transducer may comprise one or more output electrodes for providing electric signals (e.g. to a multi-electrode array) for electrically stimulating the cochlear nerve (cochlear implant type hearing aid).

In the embodiment of FIG. 3, the beamformer filter comprises a target-maintaining beamformer (TM-BF), e.g. an MVDR beamformer and a target-canceling beamformer (TC-BF) (also termed 'blocking matrix B(k,l)', cf. e.g. eq. (6) above). Other beamformer structures may be used.

The signal processing unit (SPU) comprises a control unit (CONT) configured to provide inputs to the noise reduction system. The control unit (CONT) may e.g. comprise a voice activity detector for determining a speech presence probability at a given point in time (and corresponding a probability of absence of speech). The voice activity detector may be configured to provide a binary estimate of whether or not a human voice is present in a sound signal. The voice activity detector may be adapted to estimate—at a given point in time—whether or not or with what probability a human voice is present in a sound signal at a given frequency. This may have the advantage of allowing the determination of parameters related to noise or speech during time segments where noise or speech, respectively, is (estimated to be) present. A voice signal is in the present context taken to include a speech signal from a human being. The control unit (CONT) may further comprise of have access to a memory storing pre-determined and possibly later updated filter weights for the beamformer filter (e.g. for the target-maintaining beamformer (TM-BF) and/or for the target-canceling beamformer (TC-BF). Additionally or alternatively, the control unit may be configured to estimate a current look vector d during target speech activity based on the multitude of electric input signals and/or to estimate a noise covariance matrix $C_v$ during speech pauses. Based thereon, beamformer weights may be determined. An estimate of the look vector is generally used as an input to the beamformer filter (as e.g. illustrated in FIG. 3 by arrows denoted d). Alternatively these estimations may be performed in the respective beamformer blocks (TM-BF, TC-BF).

The M electric input signals ($X_1(k, l), \ldots, X_M(k, l)$) are connected to the target maintaining beamformer (TM-BF), and to the target-canceling beamformer (TC-BF) and possibly to the control unit (CONT). The beamformer filter processes the M electric input signals and provides an estimate Y of a target signal s from a target sound source represented in the M electric input signals (based on the M electric input signals and the estimate of the look vector d, and possibly on further control or sensor signals). The (currently relevant) target sound source may e.g. be selected by the user, e.g. via a user interface or by looking in the direction of such sound source. Alternatively, it may be selected by an automatic procedure, e.g. based on prior knowledge of potential target sound sources (e.g. frequency content information, modulation, etc.).

The characteristics (e.g. spatial fingerprint) of the target signal is represented by the look vector d whose elements ($d_m(k,l)$, m=1, . . . , M) may define the (frequency (and possibly time) dependent) absolute acoustic transfer function from a target signal source to each of the M input transducers (e.g. microphones), or the relative acoustic transfer function from the $m^{th}$ input transducer to a reference input transducer (among the M input transducers). The vector element $d_m(k,l)$ is typically a complex number for a specific frequency (k) and time unit (l). The look vector d may be predetermined, e.g. measured (or theoretically determined) in an off-line procedure or estimated in advance of or during use. The look vector may be estimated in an off-line calibration procedure. This can e.g. be relevant, if the target source is at a fixed location (or direction) compared to the input unit(s), if e.g. the target source is (assumed to be) in a particular location (or direction) relative to (e.g. in front of) the user (i.e. relative to the device (worn or carried by the user) wherein the input transducers are located). One or more predetermined look vectors may be stored in the memory, e.g. corresponding to different directions to (and possibly distances to) a target sound source.

The target-maintaining beamformer (TM-BF) may be configured to leave all signal components from all directions (of the M electric input signals) essentially un-attenuated in the resulting all-pass signal Y(k,l). The target-canceling beamformer (TC-BF) may be configured to maximally attenuate signal components from the target direction in the resulting target-canceled signal. The target-canceling beamformer (TC-BF) may be configured to determine estimates of power spectral densities $\lambda_s(k,l)$ and $\lambda_v(k,l)$ of said target and noise signal components, respectively, according to the present disclosure. The target-canceling beamformer (TC-BF) provides respective post-filter gains $G_{PF}(k,l)$ for attenuating remaining noise components in the spatially filtered signal Y in dependence of the estimates of power spectral densities $\lambda_s(k,l)$ and $\lambda_v(k,l)$. The post-filter gains $G_{PF}(k,l)$ may e.g. be determined as a single-channel Wiener filter gain, given by $G_{PF}(k,l)=\lambda_s/(\lambda_s+\lambda_v/(d^H T_{-1} d))$. The post-filter gains $G_{PF}(k,l)$ are applied to the spatially filtered signal Y in the post-filter (PF), thereby providing the (improved) estimate Ŝ(k,l) of the target signal, which is fed to the signal processor (PRO) for optional further processing.

FIG. 4A schematically shows a time variant analogue signal ('Amplitude' vs 'time') and its digitization in samples, the samples being arranged in a number of time frames, each comprising a number $N_s$ of samples. FIG. 4A shows an analogue electric signal (solid graph), e.g. representing an acoustic input signal, e.g. from a microphone, which is converted to a digital audio signal in an analogue-to-digital (AD) conversion process, where the analogue signal is sampled with a predefined sampling frequency or rate $f_s$, $f_s$ being e.g. in the range from 8 kHz to 40 kHz (adapted to the particular needs of the application) to provide digital samples x(n) at discrete points in time n, as indicated by the vertical lines extending from the time axis with solid dots at its endpoint coinciding with the graph, and representing its digital sample value at the corresponding distinct point in time n. Each (audio) sample x(n) represents the value of the acoustic signal at n by a predefined number $N_b$ of bits, $N_b$ being e.g. in the range from 1 to 16 bits. A digital sample x(n) has a length in time of $1/f_s$, e.g. 50 µs, for $f_s$=20 kHz. A number of (audio) samples $N_s$ are arranged in a time frame, as schematically illustrated in the lower part of FIG. 4A, where the individual (here uniformly spaced)

samples (1, 2, ..., $N_s$) are grouped in time frames (1, ..., L). As also illustrated in the lower part of FIG. 4A, the time frames may be arranged consecutively to be non-overlapping (time frames 1, 2, ..., 1, ..., L) or overlapping (here 50%, time frames 1, 2, ..., 1, ..., M'), where l is a time frame index. A time frame may e.g. comprise 64 audio data samples. Other frame lengths may be used depending on the practical application.

FIG. 4B schematically illustrates a time-frequency representation of the (digitized) time variant electric signal x(n) of FIG. 2A. The time-frequency representation comprises an array or map of corresponding complex or real values of the signal in a particular time and frequency range. The time-frequency representation may e.g. be a result of a Fourier transformation converting the time variant input signal x(n) to a (time variant) signal X(k,l) in the time-frequency (or filter bank) domain. The Fourier transformation comprises a discrete Fourier transform algorithm (DFT), or a Short Time Fourier Transform (STFT), or similar algorithm. The frequency range considered by a typical hearing aid (e.g. a hearing aid) from a minimum frequency $f_{min}$ to a maximum frequency $f_{max}$ comprises a part of the typical human audible frequency range from 20 Hz to 20 kHz, e.g. a part of the range from 20 Hz to 12 kHz. In FIG. 4B, the time-frequency representation X(k,l) of signal x(n) comprises complex values of magnitude and/or phase of the signal in a number of DFT-bins (or tiles) defined by indices (k,l), where k=1, ..., K represents a number K of frequency values (cf. vertical k-axis in FIG. 4B) and l=1, ..., L (L') represents a number L (L') of time frames (cf. horizontal l-axis in FIG. 4B). A time frame is defined by a specific time index l and the corresponding K DFT-bins (cf. indication of Time frame l in FIG. 4B). A time frame l represents a frequency spectrum of signal x at time l. A DFT-bin or tile (k,l) comprising a (real) or complex value X(k,l) of the signal in question is illustrated in FIG. 4B by hatching of the corresponding field in the time-frequency map. Each value of the frequency index k corresponds to a frequency range $\Delta f_k$, as indicated in FIG. 4B by the vertical frequency axis f. Each value of the time index l represents a time frame. The time $\Delta t_l$ spanned by consecutive time indices depend on the length of a time frame (e.g. $\Delta t_l$=3.2 ms, e.g. for $f_s$=20 kHz and $N_s$=64) (cf. horizontal t-axis in FIG. 4B).

In the present application, a number I of (non-uniform) frequency sub-bands with sub-band indices i=1, 2, ..., I is defined, each sub-band comprising one or more DFT-bins (cf. vertical Sub-band i-axis in FIG. 4B). The i$^{th}$ sub-band (indicated by Sub-band i ($X'_i(l)$ in the right part of FIG. 4B) comprises DFT-bins (or tiles) with lower and upper indices $k_i^{min}$ and $k_i^{max}$, respectively, defining lower and upper cut-off frequencies of the i$^{th}$ frequency sub-band, respectively. A specific time-frequency unit (i,l) is defined by a specific time index l and the DFT-bin indices $k_i^{min-k_i^{max}}$, as indicated in FIG. 4B by the bold framing around the corresponding DFT-bins (or tiles). A specific time-frequency unit (i,l) contains complex or real values of the i$^{th}$ sub-band signal $X'_i(l)$ at time l. The frequency sub-bands may be third octave bands.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The scheme for determining improved maximum-likelihood estimates of power spectral densities $\lambda_s(k,l)$ and $\lambda_v(k,l)$ of target and noise signal components, respectively, has been presented in the framework of hearing aids. The scheme may be used in connection with other audio processing devices wherein noise reduction is desirable, e.g. in headsets (for reducing noise in sound transmitted to a far-end device), active ear protection devices (where sound from a noisy environment should be enhanced, by suppressing noise while presenting target speech to the user), or other listening devices.

Accordingly, the scope should be judged in terms of the claims that follow.

REFERENCES

US20180359572A1 (Oticon) 13.12.2018
U.S. Pat. No. 10,165,373B2 (Oticon) 12.10.2017
[Jensen & Pedersen; 2015] J. Jensen and M. S. Pedersen, "Analysis of beamformer directed single-channel noise reduction system for hearing aid applications," in 2015 IEEE International Conference on Acoustics, Speech and Signal Processing (ICASSP). IEEE, 2015, pp. 5728-5732.
[Palomar & Fonollosa; 2005] D. Pérez Palomar and J. Rodriguez Fonollosa, "Practical algorithms for a family of waterfilling solutions", IEEE Transactions on Signal Processing, Vol. 53, Issue 2, February 2005, pp. 686-695.
[Zahedi et al.; 2020] Adel Zahedi, Michael Syskind Pedersen, Jan Østergaard, Lars Bramsløw, Thomas Ulrich Christiansen, Jesper Jensen, "A constrained maximum likelihood estimator of speech and noise spectra with application to multi-microphone noise reduction", IEEE International Conference on Acoustics, Speech, and Signal Processing, ICASSP' 20, pp. 6944-6948, 1. April 2020.

The invention claimed is:

1. A hearing aid configured to compensate for a user's hearing impairment, comprising
an input unit comprising a multitude of M input transducers, each configured to convert sound in an environment of the user to an electric input signal representative of said sound, each of the multitude of electric input signals being provided in a time-frequency representation (k, l), where k and l are frequency and time frame indices, respectively, (k, l) defining a time-frequency tile, and k=1, . . . , K, where K is a number of frequency bins, and wherein the electric input signals $X_m(k,l)$, m=1, . . . , M, each comprise varying amounts of target (s) and noise (v) signal components originating from a target sound source and one or more noise sound sources, respectively, in said environment;
a signal processor configured to process said multitude of electric input signals and for providing a processed electric signal representative of said sound; and
wherein the signal processor comprises a noise reduction system comprising a beamformer filter followed by a post-filter,
the beamformer filter being connected to the input unit and configured to receive said multitude M of electric input signals $X_m(k,l)$ and configured to provide a spatially filtered signal,
the post-filter being configured to receive said spatially filtered signal and to provide an estimate $\hat{S}(k,l)$ of a target signal representing said target signal components from said target sound source; and
wherein the signal processor is configured to provide estimates of power spectral densities $\lambda_s(k,l)$ of said target signal components in dependence of inter-frequency bin relationships between the spectral components of the target signal components and/or of the noise signal components across at least some of said frequency bins.

2. A hearing aid according to claim 1 wherein the estimates of power spectral densities $\lambda_s(k,l)$ of the target signal components are provided under the constraint that the final target speech power spectral density estimates $\lambda_s(k,l)$ a) are all non-negative, and b) sum across frequency, for a given frame index, to a less biased a priori estimate of the clean speech estimate for the frequency range in question.

3. A hearing aid according to claim 1 wherein the signal processor comprises or has access to a multitude D of observations of the electric input signals $X_m(k,l)$ at different time frame indices l.

4. A hearing aid according to claim 1 wherein the signal processor is configured to provide first maximum likelihood estimates $\lambda_s^{ML}(k,l)$ and $\lambda_v^{ML}(k,l)$ of power spectral densities $\lambda_s(k,l)$ and $\lambda_v(k,l)$ of said target and noise signal components, respectively, estimated independently in each frequency bin.

5. A hearing aid according to claim 3 wherein the signal processor is configured to provide estimates of power spectral densities $\lambda_s(k,l)$ of said target signal components in dependence of said multitude of observations of the electric input signals by solving an estimation problem wherein the likelihood of said power spectral densities of said target and noise signal components is maximized, where the likelihood is computed across a multitude of frequency bins for a given time instant l', under constraints regarding said estimates of power spectral densities $\lambda_s(k,l)$ of said target signal components.

6. A hearing aid according to claim 5 wherein said constraints comprise
a) that a sum of said estimates of power spectral densities $\lambda_s(k,l)$ over frequency indices, $k=k_i^{min}$, . . . , $k_i^{max}$, is equal to a corresponding sum of first maximum likelihood estimates $\lambda_s^{ML}(k,l)$, and
b) that each of said estimates of power spectral densities $\lambda_s(k,l)$ over frequency indices, $k=k_i^{min}$, . . . , $k_i^{max}$, are larger than or equal to zero.

7. A hearing aid according to claim 6 wherein frequency bins between $k_i^{min}$ and $k_i^{max}$ represent a frequency sub-band of the electric input signals.

8. A hearing aid according to claim 6 wherein $k_i^{min}$ is equal to 1, and wherein $k_i^{max}$ is equal to K, whereby index i represents a full-band signal.

9. A hearing aid according to claim 4 wherein said estimates of the power spectral densities $\lambda_v(k,l)$ of said noise signal components are equal to the first maximum likelihood estimates $\lambda_v^{ML}(k,l)$.

10. A hearing aid according to claim 4 wherein said estimates of the power spectral densities $\lambda_s(k,l)$ of said target signal components is determined in dependence of
said first maximum likelihood estimates $\lambda_v^{ML}(k,l)$
current beamformer weights w(k,l), and
$\hat{C}_x(k,l)$ an estimate of a noisy covariance matrix $C_x(k,l)$ computed as a sample covariance matrix of the M electric input signals $X_m(k,l)$, m=1, . . . , M, or a as a recursively updated covariance matrix estimate.

11. A hearing aid according to claim 1 wherein said post-filter is configured to apply post-filter gains to said spatially filtered signal in dependence of said estimates of power spectral densities $\lambda_s(k,l)$ and $\lambda_v(k,l)$ of said target and noise signal components to thereby provide said estimate $\hat{S}(k,l)$ of the target signal.

12. A hearing aid according to claim 11 wherein said post-filter gains $G_{PF}(k,l)$ are determined from the respective target and noise power spectral densities $\lambda_s(k,l)$ and $\lambda_v(k,l)$ as a single-channel Wiener filter gain, given by $G_{PF}(k,l)=\lambda_s/(\lambda_s+\lambda'_v)$, where $\lambda'_v$ is a normalized noise power spectral density.

13. A hearing aid according to claim 1 wherein said beamformer filter is or comprises an LCMV beamformer.

14. A hearing aid according to claim 1 comprising an output unit comprising an output transducer for converting said processed electric signal to stimuli perceivable by the user as sound, and/or a transmitter for transmitting processed electric signal to another device or system.

15. A hearing aid according to claim 14 wherein said estimate $\hat{S}(k,l)$ of a target signal representing sound from said target sound source may a) be presented to a user of the hearing aid, and/or b) be transmitted to another device or system for use and/or further analysis there.

16. A hearing aid according to claim 1 wherein said target sound source is sound from the user's mouth.

17. A hearing aid according to claim 15 wherein said estimate $\hat{S}(k,l)$ of a target signal represents the user's own voice and a) is transmitted to a far end communication partner and/or b) is forwarded to a keyword detector of the hearing aid and/or of another device.

18. A hearing aid according to claim 1 being constituted by or comprising an air-conduction type hearing aid, a bone-conduction type hearing aid, a cochlear implant type hearing aid, or a combination thereof.

19. A method of operating a hearing aid configured to compensate for a user's hearing impairment, the method comprising providing a multitude M of electric input signals representing sound in an environment of the user in a time-frequency representation (k, l), where k and l are frequency and time frame indices, respectively, (k, l) defining a time-frequency tile, and k=1, . . . , K, where K is the number of frequency bins, and wherein the electric input signals $X_m(k,l)$, m=1, . . . , M, each comprise varying amounts of target (s) and noise (v) signal components originating from a target sound source and one or more noise sound sources in said environment;

processing said multitude of electric input signals and providing a processed electric signal representative of said sound; and providing a spatially filtered signal by beamforming in dependence the input unit and configured to receive said multitude M of electric input signals $X_m(k,l)$, and providing an estimate $\hat{S}(k,l)$ of a target signal representing said target signal components from said target sound source by post-filtering said spatially filtered signal, and providing estimates of power spectral densities $\lambda_s(k,l)$ of said target signal components in dependence of inter-frequency bin relationships between the spectral components of the target signal and/or of the noise signal components across at least some of said frequency bins.

20. A method according to claim 19 comprising determining post-filter gains in dependence of said estimates of power spectral densities $\lambda_s(k,l)$ and $\lambda_v(k,l)$ of said target and noise signal components; and applying said post-filter gains to said spatially filtered signal to thereby provide said estimate $\hat{S}(k,l)$ of the target signal.

* * * * *